United States Patent
Lee et al.

(10) Patent No.: US 12,362,413 B2
(45) Date of Patent: Jul. 15, 2025

(54) BATTERY CELL, AND BATTERY MODULE, BATTERY PACK AND VEHICLE INCLUDING THE SAME

(71) Applicant: LG Energy Solution, Ltd., Seoul (KR)

(72) Inventors: Seung-Byung Lee, Daejeon (KR); Ah-Ram Park, Daejeon (KR); Kyoung-Soon Yoon, Daejeon (KR); Seok-Je Kim, Daejeon (KR); Yong-Tae Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 315 days.

(21) Appl. No.: 17/899,858

(22) Filed: Aug. 31, 2022

(65) Prior Publication Data
US 2023/0402675 A1    Dec. 14, 2023

(30) Foreign Application Priority Data

Jun. 13, 2022  (KR) .................. 10-2022-0071596

(51) Int. Cl.
| | |
|---|---|
| *H01M 10/6551* | (2014.01) |
| *H01M 10/613* | (2014.01) |
| *H01M 10/647* | (2014.01) |
| *H01M 10/653* | (2014.01) |
| *H01M 50/105* | (2021.01) |

(Continued)

(52) U.S. Cl.
CPC ..... *H01M 10/6551* (2015.04); *H01M 10/613* (2015.04); *H01M 10/647* (2015.04); *H01M 10/653* (2015.04); *H01M 50/105* (2021.01); *H01M 50/178* (2021.01);
(Continued)

(58) Field of Classification Search
CPC ............ H01M 10/613; H01M 10/647; H01M 10/653; H01M 10/6551
See application file for complete search history.

(56) References Cited

U.S. PATENT DOCUMENTS

| 6,515,449 B1 | 2/2003 | Thomas et al. |
| 2013/0295430 A1 | 11/2013 | Kurahashi |

(Continued)

FOREIGN PATENT DOCUMENTS

| CN | 209607862 U | 11/2019 |
| CN | 112687993 A | 4/2021 |

(Continued)

OTHER PUBLICATIONS

Extended European Search Report including Written Opinion for Application No. 22937659.5 dated May 15, 2025. 10 pages.

*Primary Examiner* — Kevin E Yoon
(74) *Attorney, Agent, or Firm* — Lerner David LLP (57) ABSTRACT

A battery cell having an electrode tab with enhanced safety and improved cooling performance, and a battery module, a battery pack and a vehicle including the same is provided. The battery cell includes an electrode assembly including a cell body and an electrode tab provided to at least one side of the cell body, a cell case configured to accommodate the electrode assembly, an electrode lead drawn out of the cell case and connected to the electrode assembly through the electrode tab at a coupling portion, and a tab protection module accommodated in the cell case and covering at least a part of the electrode tab, the tab protection module including a heat dissipating material configured to discharge heat to the outside through at least a part thereof.

11 Claims, 8 Drawing Sheets

US 12,362,413 B2
Page 2

(51) Int. Cl.
*H01M 50/178* (2021.01)
*H01M 50/533* (2021.01)
*H01M 10/625* (2014.01)

(52) U.S. Cl.
CPC ........ *H01M 50/533* (2021.01); *H01M 10/625* (2015.04); *H01M 2220/20* (2013.01)

(56) References Cited

U.S. PATENT DOCUMENTS

| | | |
|---|---|---|
| 2014/0242426 A1 | 8/2014 | Kwak et al. |
| 2017/0117529 A1 | 4/2017 | Kang |
| 2017/0352933 A1 | 12/2017 | Choi et al. |
| 2018/0261900 A1 | 9/2018 | Kim et al. |
| 2022/0131239 A1 | 4/2022 | Hwang et al. |
| 2023/0170590 A1 | 6/2023 | Yoon et al. |
| 2023/0291041 A1 | 9/2023 | Yoon et al. |

FOREIGN PATENT DOCUMENTS

| | | | | |
|---|---|---|---|---|
| JP | 2003178747 A | 6/2003 | | |
| JP | 2012059361 A | 3/2012 | | |
| JP | 2014170735 A | 9/2014 | | |
| JP | 2024524122 A | 7/2024 | | |
| JP | 2024534196 A | 9/2024 | | |
| KR | 20010045058 A | 6/2001 | | |
| KR | 2003-0031286 A | 4/2003 | | |
| KR | 20160138809 A | 12/2016 | | |
| KR | 101734327 B1 | 5/2017 | | |
| KR | 20170047651 A | 5/2017 | | |
| KR | 20170050445 A | 5/2017 | | |
| KR | 101853166 B1 | 4/2018 | | |
| KR | 2018-0103625 A | 9/2018 | | |
| KR | 102092267 B1 | 3/2020 | | |
| KR | 102227808 B1 | 3/2021 | | |
| KR | 20220071110 A | 5/2022 | | |
| KR | 1020220055609 A | * | 5/2022 | ........ H01M 10/0525 |
| WO | WO-2016190521 A1 | * | 12/2016 | ........ H01M 10/4207 |

* cited by examiner

BATTERY CELL, AND BATTERY MODULE, BATTERY PACK AND VEHICLE INCLUDING THE SAME

CROSS-REFERENCE TO RELATED APPLICATIONS

The present application claims priority from KR 10-2022-0071596 filed on Jun. 13, 2022, the disclosure of which is hereby incorporated by reference herein.

TECHNICAL FIELD

The present disclosure relates to a battery cell, and a battery module, a battery pack and a vehicle including the same, and more particularly, to a battery cell having an electrode tab with enhanced safety and improved cooling performance, and a battery module, a battery pack and a vehicle including the same.

BACKGROUND ART

Secondary batteries that are easily applicable to various product groups and have electrical characteristics such as high energy density are universally used not only in portable devices, but also in electric vehicles (EVs) and hybrid electric vehicles (HEVs), as an electric drive source. These secondary batteries are attracting attention as a new energy source for their improved eco-friendliness and energy efficiency due not only to their primary advantage of dramatically reducing the use of fossil fuels but also their secondary advantage of not generating by-products from the use of energy.

Example secondary batteries currently widely used in the art include a lithium ion battery, a lithium polymer battery, a nickel cadmium battery, a nickel hydride battery, a nickel zinc battery, and the like. The operating voltage of such a unit secondary battery cell, namely a unit battery cell, is about 2.5V to 4.5V. Therefore, when a higher output voltage than this is required, a battery pack may be configured by connecting a plurality of battery cells in series. In addition, according to the charge/discharge capacity required for the battery pack, a plurality of battery cells are connected in parallel. Accordingly, the number of battery cells included in the battery pack may be set in various ways according to a required output voltage or charge/discharge capacity.

When a battery pack is configured by connecting a plurality of battery cells in series/in parallel, in general, a battery module including at least one battery cell is configured first, and other components are added to the at least one battery module to configure the battery pack.

In a conventional battery cell, the periphery of an electrode tab, that is connected to the electrode lead, is surrounded only by the cell case without a separate protective structure. As a result, the corresponding portion is vulnerable to breaking and/or separating from the electrode lead when an external force transmitted through the cell case or the electrode lead. In addition, the conventional battery cell has a problem in that there is no configuration capable of effectively discharging heat generated inside the cell case to the outside during charging and discharging of the battery cell.

DISCLOSURE

Technical Problem

The present disclosure is designed to solve the problems of the related art, and therefore the present disclosure is directed to providing a battery cell having an electrode tab with enhanced safety and improved cooling performance, and a battery module, a battery pack and a vehicle including the same.

However, the technical object to be solved by the present disclosure is not limited to the above, and other objects not mentioned herein will be clearly understood by those skilled in the art from the following disclosure.

Technical Solution

In one aspect of the present disclosure, there is provided a battery cell, comprising: an electrode assembly including a cell body and an electrode tab provided to at least one of both sides of the cell body; a cell case configured to accommodate the electrode assembly therein; an electrode lead drawn out of the cell case by a predetermined length and connected to the electrode assembly through the electrode tab; and a tab protection module accommodated in the cell case and configured to cover at least a part of the electrode tab, the tab protection module being configured to discharge heat to the outside through at least a part thereof.

Preferably, the tab protection module may include a first portion configured such that at least a part thereof faces the electrode tab and having an insulating material; and a second portion disposed at the first portion and configured such that at least a part thereof faces an inner surface of the cell case, the second portion being configured to discharge heat to the outside of the tab protection module.

Preferably, the second portion may be configured to have a shape corresponding to the inner surface of the cell case facing the second portion.

Preferably, the battery cell may further comprise an electrical insulation member disposed at an outer surface of the second portion that faces the inner surface of the cell case.

Preferably, the electrical insulation member may have at least one heat dissipation hole formed in a surface thereof.

Preferably, the first portion may have a seating groove formed to be recessed toward the electrode tab by a predetermined depth so that the second portion is disposed therein.

Preferably, at least a part of an outer surface of the seating groove may be rounded to correspond to at least a part of the second portion.

Preferably, the seating groove may include a guide groove formed to be recessed toward the electrode tab by a predetermined depth, and the second portion may further include a protrusion configured to be inserted into the guide groove.

Preferably, the second portion may include a pair of bent portions configured to be bent toward the cell body at an end of the first portion adjacent to the electrode lead and configured to face each other in an upper and lower direction, and the portion where the electrode tab and the electrode lead are connected may be disposed between the pair of bent portions.

Preferably, the battery cell may further comprise a heat transfer member disposed between the pair of bent portions and the portion where the electrode tab and the electrode lead are connected.

Also, in another aspect of the present disclosure, there is also provided a battery module, comprising at least one battery cell according to an aspect of the present disclosure.

Also, in another aspect of the present disclosure, there is also provided a battery pack, comprising at least one battery module according to an aspect of the present disclosure.

Also, in another aspect of the present disclosure, there is also provided a vehicle, comprising at least one battery pack according to an aspect of the present disclosure.

Advantageous Effects

According to an embodiment of the present disclosure, when an impact occurs outside the battery cell, it is possible to effectively prevent the electrode tab, which is structurally weak, from being separated from the electrode lead, or damaged, which may result in the emission of heat generated inside the battery cell.

Moreover, according to various embodiments of the present disclosure, several other additional effects may be achieved. Various effects of the present disclosure will be described in detail in each embodiment, or any effects that can be easily understood by those skilled in the art will not be described in detail.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure. Furthermore, the terms "substantially," "generally," "about" and the like are intended to mean that slight deviations from absolute are included within the scope of the term so modified.

FIGS. 1-4 illustrate a battery cell 10 according to an embodiment of the present disclosure. The battery cell 10 may be a secondary battery such as a pouch-type battery and includes an electrode assembly 100, a cell case 200, an electrode lead 300, and a tab protection module 400. As is shown in the drawings, the X-axis direction refers to a longitudinal direction of the battery cell 10, the Y-axis direction refers to a lateral direction (left and right) of the battery cell 10 oriented perpendicular to the X-axis on the horizontal plane (XY plane), and the Z-axis direction refers to an upper and lower direction perpendicular to both the X-axis direction and the Y-axis direction.

The electrode assembly 100 includes a cell body 110 and an electrode tab 120.

The cell body 110 may be defined as a portion of the electrode assembly 100 other than the electrode tab 120 while the electrode tab 120 extends from one side of the cell body 110.

Although not shown in detail, the electrode assembly 100 may include a first electrode plate having a first polarity, a second electrode plate having a second polarity, and a separator interposed between the first electrode plate and the second electrode plate. As an example, the first electrode plate may be a positive electrode plate coated with a positive electrode active material or a negative electrode plate coated with a negative electrode active material, and the second electrode plate may correspond to an electrode plate having a polarity opposite to that of the first electrode plate.

The electrode tab 120 is typically formed by a notching process and refers to the uncoated portion of the electrode plate that protrudes from the cell body 110. That is, a positive electrode active material or a negative electrode active material is not applied to the electrode tab 120. Specifically, the electrode tab 120 may be formed by gathering a plurality of electrode tabs together from a plurality of stacked electrode plates.

However, the electrode tab 120 need not be formed by the above-described notching process. Instead, the electrode tab 120 may alternatively be separately manufactured and then subsequently coupled to the cell body 110.

The cell case 200 accommodates the electrode assembly 100. That is, the cell case 200 defines an accommodation space for accommodating the electrode assembly 100 therein. At this time, the cell case 200 also accommodates an electrolyte therein, and the cell case 200 accommodates the electrode assembly 100 such that the electrode assembly 100 is impregnated in the electrolyte. As an example, the cell case 200 may include a pouch film including a layer of a metal material (e.g., aluminum (Al)), but is not limited thereto.

The electrode lead 300 is coupled to the electrode tab 120 and drawn out of the cell case 200 by a predetermined length. The electrode lead 300 may be provided in a pair, and the pair of electrode leads 300 may be provided to opposite sides of the cell case 200, in the X-axis direction, or may be provided to only one side, to correspond to the arrangement of the electrode tab 120. In addition, a lead film F for sealing the cell case 200 and the electrode lead 300 to each other may be interposed between the cell case 200 and the electrode lead 300. As an example, the lead film F may be provided as a heat-fusing film to increase the sealing force of the area of the cell case 200 where the electrode lead 300 is disposed. In addition, the lead film F may include an insulating material to prevent a short circuit of the electrode lead 300.

The electrode lead 300 is connected to the electrode assembly 100 inside the cell case 200 through the electrode tab 120. As an example, the electrode lead 300 may be coupled to the electrode tab 120 by welding or the like.

Typically, electrode tabs have a relatively small thickness compared to cell bodies. Therefore, the electrode tab is vulnerable to breaking, or otherwise separating from the electrode lead, when an external force is applied to the cell case. In battery cell 10, however, the tab protection module 400 is accommodated inside the cell case 200 and covers at least a part of the electrode tab 120. By covering the electrode tab 120 with the tab protection module, the tab protection module 400 is arranged to receive at least a part of the external force or the like transmitted to the cell case 200.

Specifically, the tab protection module 400 is arranged to absorb at least part of an impact caused by an external force transmitted to the cell case 200 and, in some implementations, is configured to disperse the impact away from the vulnerable electrode tab 120, for example, to other regions of the electrode assembly. Accordingly, the impact on the vulnerable electrode tab 120 may be minimized.

Even more specifically, the tab protection module 400 is configured to cover at least a part of the electrode tab 120 and engage an inner surface of the cell case 200. In this regard, the tab protection module 400 is arranged to absorb an external force applied to the cell case 200 and disperse the impact away from the electrode tab 120 to prevent the structurally weak electrode tab 120 from breaking and/or separating from the electrode lead 300 as a result of the impact.

Furthermore, the tab protection module 400 is arranged to discharge heat generated inside the battery cell 10 through at least a part thereof. That is, at least a part of the tab protection module 400 is formed of a heat dissipation material that allows heat generated inside the cell case 200 to be discharged to a location outside the cell case 200 during charging and discharging of the battery cell 10.

Still yet, an event such as a thermal runaway phenomenon may occur in the battery cell 10. When a thermal runaway phenomenon occurs, a high-temperature and high-pressure venting gas may be generated inside the cell case 200. As mentioned above, the heat dissipating material of the tab protection module 400 is configured to discharge the high-temperature gas. Furthermore, the internal pressure within the cell case 200 does not rapidly increase as a result of the venting gas generated inside the cell case 200 because the accommodation portion 220 in which the tab protection module 400 is disposed increases the volume of the cell case 200. Accordingly, it is possible to effectively delay the time when a certain region of the cell case 200 is damaged and the venting gas is discharged to the outside of the cell case 200.

In summary, the tab protection module 400 of battery cell 10 provides several advantages including: (1) dispersing an externally applied force away from the structurally weak electrode tab 120 to prevent the electrode tab 120 from being damaged and/or separated from the electrode lead; (2) discharging heat generated inside the battery cell through the tab protection module 400 and to a location outside of the battery cell; and (3) permitting the cell case 200 to have a larger volume, thereby delaying the in which high-pressure venting gas negatively impacts battery performance and safety.

With additional reference to FIGS. 5 and 6, the battery cell 10 will now be described in further detail.

The tab protection module 400 may be configured to have a that shape corresponds to the inner surface of the cell case 200 facing the tab protection module 400. As a result, the tab protection module 400 may more effectively buffer the impact caused by an external force transmitted to the cell case 200 and minimize the impact of the force that is applied to the electrode tab 120. In addition, because of the corresponding shape, the tab protection module 400 may be accommodated inside the cell case 200 in a manner that is designed to prevent deformation of the cell case 200.

The cell case 200 may include an accommodation portion 220 and a sealing portion 240. The accommodation portion 220 is defined as a recessed area configured to accommodate the electrode assembly 100 therein. The sealing portion 240 extends in the X-Y plane outward from the periphery of the accommodation portion 220.

In some aspects, the cell case 200 may include a first case member 200a and a second case member 200b. In these aspects, the sealing portion 240 is defined by peripheral regions of the first case member 200a and the second case member 200b that surround the accommodation portion 220 and that contact each other and are sealed together by thermal fusion.

In addition, the sealing portion 240 may include a case terrace T. The case terrace T may refer to a region of the sealing portion 240 located in a direction along which the electrode lead 300 is drawn out from the cell case 200.

That is, the case terrace T may extend by a predetermined length from the accommodation portion 220, in the X-axis direction, to support the electrode lead 300. Specifically, the electrode lead 300 may be wrapped in the lead film F and the first case member 200a and the second case member 200b may be sealed together with the lead film F interposed between the electrode lead 300 and the case terrace T.

The tab protection module 400 described above may have a shape corresponding to the inner surface of a section of the accommodation portion 220 adjacent to the case terrace T.

When the tab protection module 400 is be accommodated in the accommodation portion 220, adjacent to terrace T, the corresponding shape of the tab protection module engages the inner surface of the cell case 200 and reinforces its rigidity. Put differently, the tab protection module 400 enhances the structural rigidity of the cell case 200 by reinforcing the structurally weaker region in the cell case 200 located at the junction of the accommodation portion 220 and the terrace T.

Referring to FIGS. 3-6, the tab protection module 400 includes a first protection cap 400a and a second protection cap 400b. In certain implementations, the first protection cap 400a may be an upper protection cap and the second protection cap 400b may be a lower protection cap. The first protection cap 400a and the second protection cap 400b are coupleable to one another and, when assembled, the tab protection module 400 at least partially covers and protects the upper and lower sides of the electrode tab 120.

The first protection cap 400a and the second protection cap 400b may be coupled to each other, for example, via hook-coupling. Specifically, one of the first protection cap 400a and the second protection cap 400b may have one or more fastening hooks 440 and, the other of the first protection cap 400a and the second protection cap 400b may have one or more hook grooves 450 into which the fastening hooks 440 are fitted.

As an example, the fastening hook 440 may be pair of fastening hooks 440 protruding from opposite sides of the second cap body 400b1. Similarly, the hook groove 450 may be a pair of hook grooves provided on the first protection cap 400a at locations configured to receive the corresponding fastening hooks 440.

It will be appreciated, however, that the number and locations of the fastening hooks 440 and hook grooves 450 are not limited to the embodiments explicitly described herein. Moreover, alternative mechanism for coupling the first protection cap 400a and the second protection cap 400b, such as a snap-fit connection, a friction-fit connection, and the like, have been contemplated.

The first protection cap 400a may include a first cap body 400a1 and first cap wings 400a2. The first cap body 400a1 has a shape corresponding to the inner surface of the cell case 200 in which it faces and is arranged to at least partially cover the upper side of the electrode tab 120.

The first cap wings 400a2 extend from both lateral ends of the first cap body 400a1. Put differently, the first cap wings 400a2 cover part of the cell body 110 provided laterally to the lateral sides of the electrode tab 120. Accordingly, the first cap wings 400a2 of the first protection cap 400a may be in close contact with the cell body 110 where the electrode tab 120 is not provided.

Similarly, the second protection cap 400b may include a second cap body 400b1 and second cap wings 400b2. The second cap body 400b1 has a shape corresponding to the inner surface of the cell case 200 in which it faces and is arranged to least partially cover the lower side of the electrode tab 120.

The second cap wings 400b2 extends from both lateral ends of the second cap body 400b1. Put differently, the second cap wing 400b2 cover part of the cell body 110 provided laterally to the lateral sides of the electrode tab 120. Accordingly, the second cap wings 400b2 of the second protection cap 400b, may be in close contact with the cell body 110 where the electrode tab 120 is not provided.

A slot 430 may be formed between the first protection cap 400a and the second protection cap 400b, when viewed from the front of the tab protection module 400, in the upper and lower directions. When the electrode lead 300 extends through the slot 430, the electrode lead is spaced apart from the upper and lower walls of the tab protection module 400 defining the slot 430. Put differently, the slot 430 is greater in height than the height of the electrode lead 300 such that when the electrode lead 300 is passed through the slot 430, the tab protection module 400 does not clamp the upper and lower surfaces of the electrode lead 300.

In this regard, when an external force is applied to cell case 200, the first protection cap 400a and the second protection cap 400b, which are in close contact with the inner surface of the cell case 200, are configured to absorb the force and disperse the force away from the electrode tab 120 with which it is not in contact. As a result, it is possible to minimize the risk of damage to the electrode tab 120. The first protection cap 400a and the second protection cap 400b may additionally include any, or all, of the features of the first and second protection caps described in priority application KR 10-2021-0116623.

Figure 5:
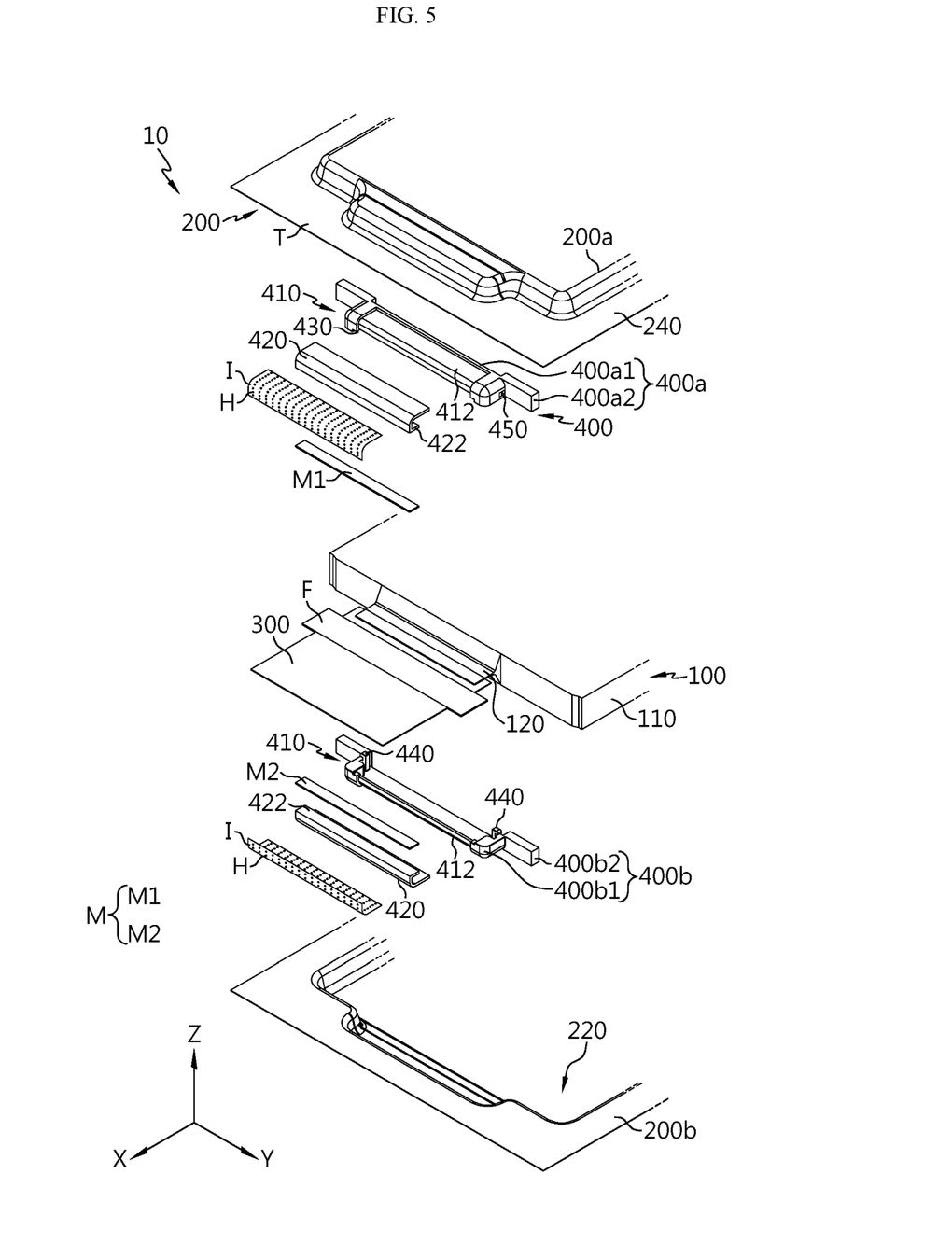
FIG. 5 is an entirely exploded perspective view of the battery cell of FIG. 1.

With specific reference to FIG. 5, each of the first protection cap 400a and the second protection cap 400b. includes a first portion 410 arranged to face the electrode tab 120 and a second portion 420 seated on the first portion 410 and arranged to face the inner surface of the cell case 200. For this reason, the first portion 410 may include an electrically insulating material. Accordingly, even when the first portion 410 comes into contact with the cell body 110, the electrode tab 120, and the like, the occurrence of a short circuit is minimized.

The second portion 420 includes a heat dissipating material configured to absorb heat generated inside the cell case 200 and then subsequently discharge the absorbed heat outside of the tab protection module 400 (e.g., away from the accommodation portion 220).

Thus, the tab protection module 400 is arranged to prevent a short circuit, and simultaneously, discharge heat generated inside the battery cell 10.

For this reason, it is important that the inner surface of the tab protection module 400 facing the electrode assembly 100 have excellent electrical insulation properties, and it is important that the outer surface of the tab protection module 400 facing the inner surface of the cell case 200 have excellent heat dissipation properties. To realize this function, the first portion 410 may include a material having relatively superior electrical insulation properties. By way of example, the insulating material may be a film, such as a polycarbonate (PC) or a polyethylene terephthalate (PET), an isolation coating, or an anodization. The second portion 420 may include a material having relatively superior heat dissipation properties. Example materials include aluminum, copper, carbon or ceramic composite sheet materials, and the like. One of ordinary skill in the art would appreciate, however, that if second portion 420 were formed of a non-electrically conducting material, the first portion 410 would not need to include an electrically insulating material. The specific materials of the first portion 410 and the second portion 420 are not limited to the foregoing examples. Any material that satisfies the above desired characteristics, and that does not cause a reaction with the electrolyte accommodated in the cell case 200, may be used.

Referring again to FIGS. 3-6, the second portion 420 may have a shape that corresponds to the inner surface of the facing cell case 200. As a result, the tab protection module 400 is configured to more efficiently discharge heat generated inside the battery cell 10 to the outside of the battery cell 10 through the cell case 200.

In some examples, battery cell 10 may further include an electrical insulation member I.

The electrical insulation member I may be disposed on the outer surface of the second portion 420 facing the inner surface of the cell case 200. That is, the electrical insulation member I may be disposed between the second portion 420 and the inner surface of the cell case 200.

The electrode tab 120 and the electrode lead 300 of the battery cell 10 are connected, typically via welding, at a coupling portion. The tab protection module 400 is configured to surround and protect at least part of the coupling portion of battery cell 10. Put differently, the coupling portion is located in an inner space of the tab protection module 400. Again, this structure minimizes damage to the electrode tab 120, and securely maintains the connection between the electrode tab 120 and the electrode lead 300.

Figure 4:
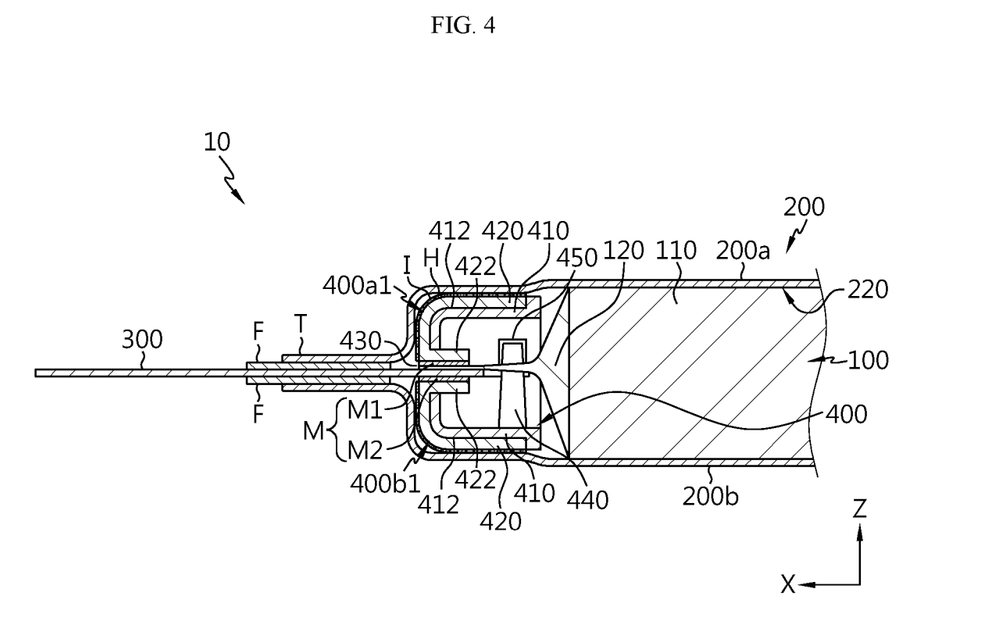
FIG. 4 is a cross-section view, taken along in the line A-A' of FIG. 1.

As shown in FIG. 4, at least a part of the coupling portion is disposed adjacent to the second portion 420. However, because the electrical insulation member I is disposed on the outer surface of the second portion 420, the likelihood of a short circuit in the region of the coupling portion, adjacent to the second portion 420, is minimized.

Figure 1:
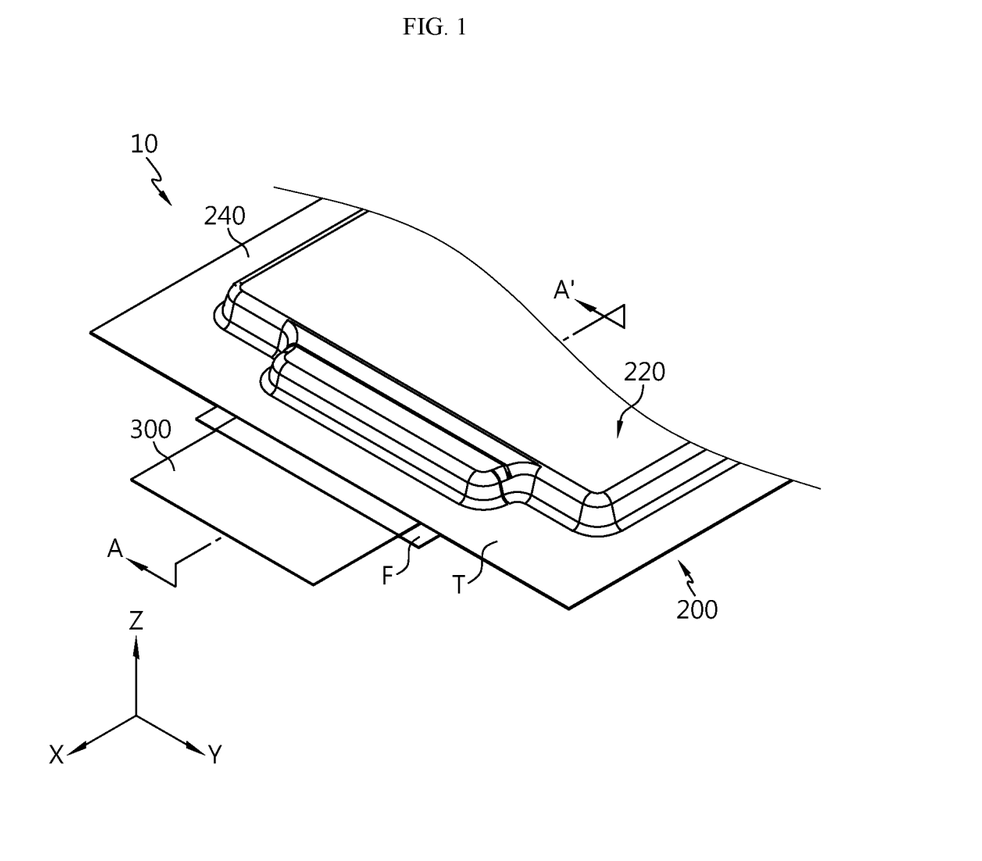
FIG. 1 is a partial perspective view showing a battery cell according to an embodiment of the present disclosure.
Figure 2:
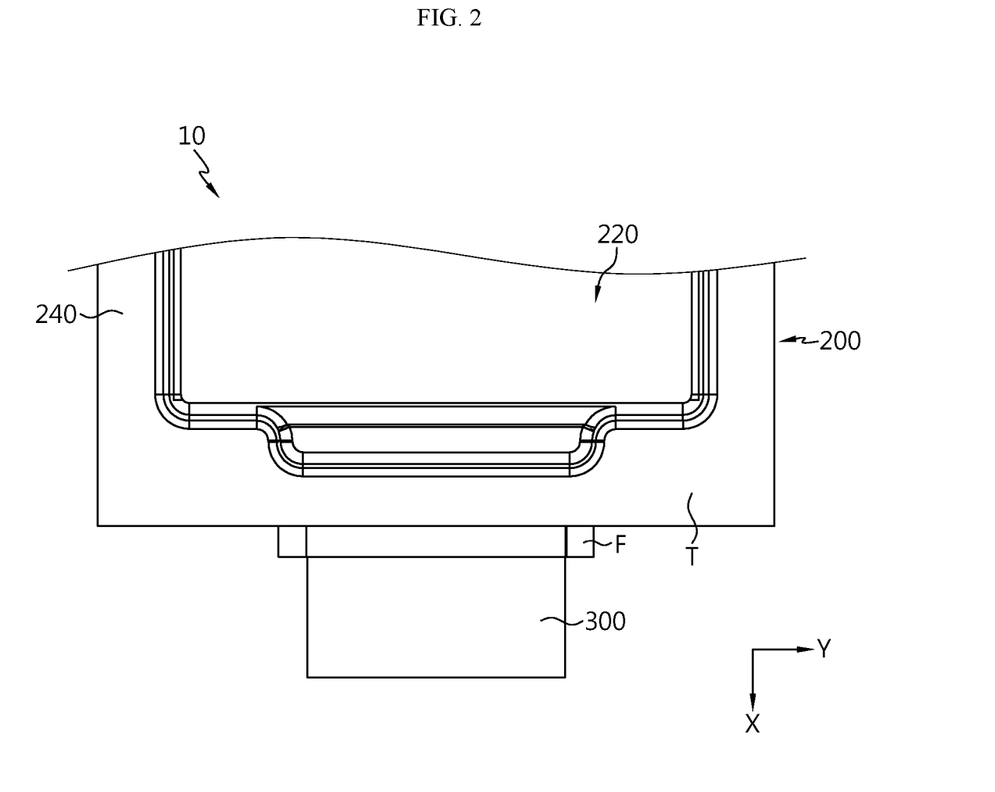
FIG. 2 is a top elevation view showing the battery cell of FIG. 1.
Figure 3:
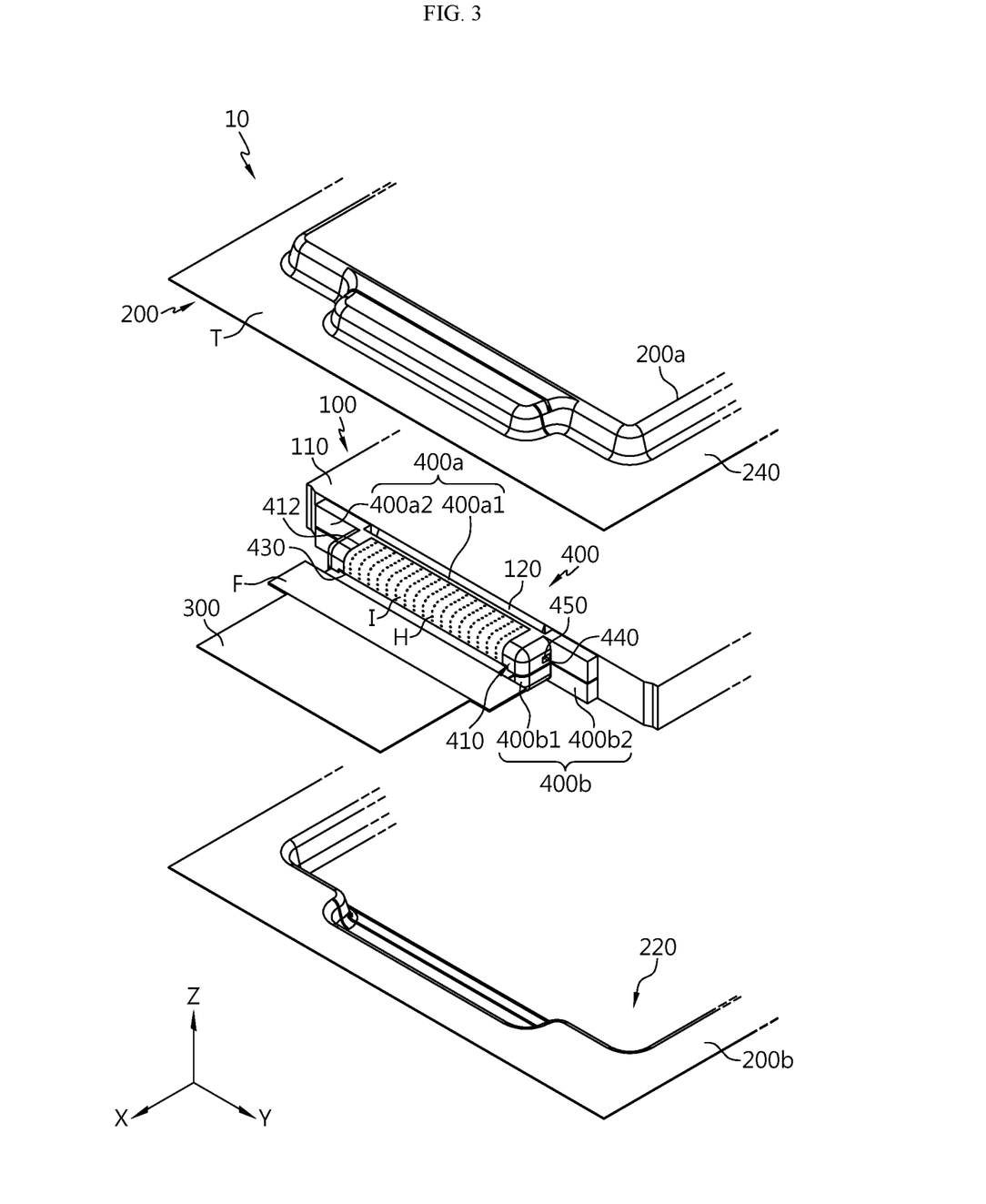
FIG. 3 is a partially exploded perspective view of the battery cell of FIG. 1.

As shown in FIGS. 3 and 5, the electrical insulation member I may include at least one heat dissipation hole H formed through the electrical insulation member.

As a result, when the second portion 420 discharges heat generated inside the battery cell 10, the heat may further be discharged through the electrical insulation member I, via the dissipation hole H, to the outside of the battery cell 10.

The combination of the first portion 410, the second portion 420, and the electrical insulation member I, is thus configured to discharge heat generated inside the battery cell 10, while minimizing the risk of a short circuit. In conventional battery calls, a material having electrical insulation properties is often applied to the inner surface of the cell case. Thus, even when the known cell cases are made of a pouch film having a metal layer, a direct short circuit is often prevented by the insulating layer that covers the metal layer. However, the use of this insulation material in this manner has other drawbacks. For example, when the inner surface of the cell case is damaged, the metal becomes exposed and the risk of a short circuit increases. The electrically insulating materials of the tab protection module 400 provide an additional safeguard against the short circuit described herein. In addition, in order to improve the heat dissipation of the tab protection module 400, the second portion 420 may include a metal material. When the second portion 420 includes a metal material, the risk of a short circuit may increase due to the direct contact between the second portion 420 and the inner surface of the cell case 200. The electrical insulation member I, alleviates this risk. Thus, it will be appreciated that the electrical insulation member I may not be needed if the second portion 420 is not formed of a heat dissipating material that is not a metal.

The first portion 410 and the second portion 420 will now be described in further detail. The first portion 410 may define a recessed seating groove 412 on the outer surface of the first portion 410.

The seating groove 412 may be formed as a recess extending from the outer surface of the first portion 410 and toward the inner surface of the first portion 410 that faces the electrode tab 120. The second portion 420 is arranged to be seated in the seating groove 412 and closely coupled to the first portion 410. In particular, at least a part of the outer surface of the seating groove 412 may be rounded to have a curvature that corresponds to at least a part of the second portion 420. That is, the seating groove 412 of the first portion 410 and the second portion 420 have approximately the same radius of curvature.

As a result of this structure, the second portion 420 is closely coupled to the first portion 410, allowing heat generated inside the battery cell 10 to be more stably discharged to the outside of the battery cell 10. Furthermore, seating the second portion 420 within the seating groove 412 of the first portion 410 offers some protection to the second portion 420 and minimizes the likelihood that the second portion 420 will be damaged upon an external impact.

Figure 6:
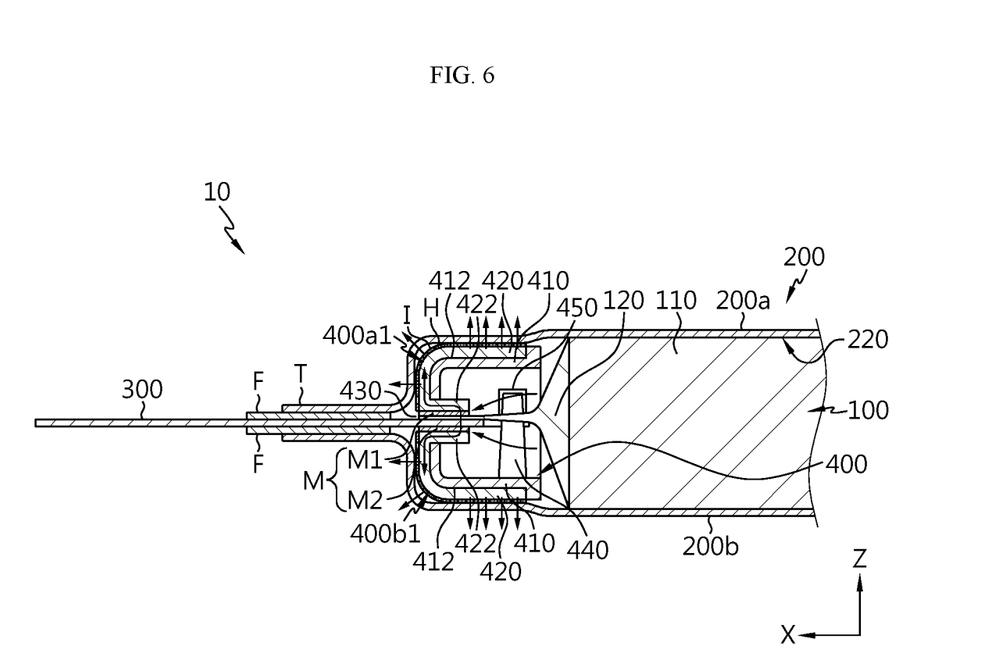
FIG. 6 is a cross-section view showing an example of a heat transfer flow inside the battery cell of FIG. 1.

The second portion 420, as shown in FIGS. 4-6, may include a bent portion 422. The bent portion 422 may extend generally in the X-Y plane and from the end of the first portion 410 toward the cell body 110. In addition, the bent portion 422 of first protection cap 400a may be configured to face the bent portion 422 of second protection cap 400b in the upper and lower directions.

Specifically, the pair of bent portions 422 may be formed to extend toward the cell body 110 to surround the ends of their respective first portions 410 adjacent to the electrode lead 300.

As shown in FIG. 4, the coupling portion may be disposed between the pair of bent portions 422. Accordingly, the second portion 420 may absorb the heat generated at the coupling portion, which is where the greatest heat is generated inside the battery cell 10. As a result, the bent portion 422 allows battery cell 10 to more efficiently discharge heat to the outside of the battery cell 10.

As shown in FIGS. 4-6, the battery cell 10 may further include a heat transfer member M having a TIM (Thermal Interface Material). The heat transfer member M may be disposed between each one of the pair of bent portions 422 and the coupling portion.

Specifically, the heat transfer member M may include a first member M1 and a second member M2. The first member M1 may be disposed against a lower surface of the bent portion 422 of the first protection cap 400a and between that bent portion 422 and the coupling portion. The second member M2 may be disposed against an upper surface of the bent portion 422 of the second protection cap 400b and between that bent portion 422 and the coupling portion.

Accordingly, the heat generated at the coupling portion may be more efficiently absorbed through the second portion 420 and more efficiently discharged to the outside of the battery cell 10. In addition, since the heat transfer members M1 and M2 are disposed between the coupling portion and their respective bent portions 422, it is possible to prevent the bent portions 422 from directly contacting the coupling portion. As a result, it is possible to minimize the occurrence of a short circuit at the coupling portion.

Figure 7:
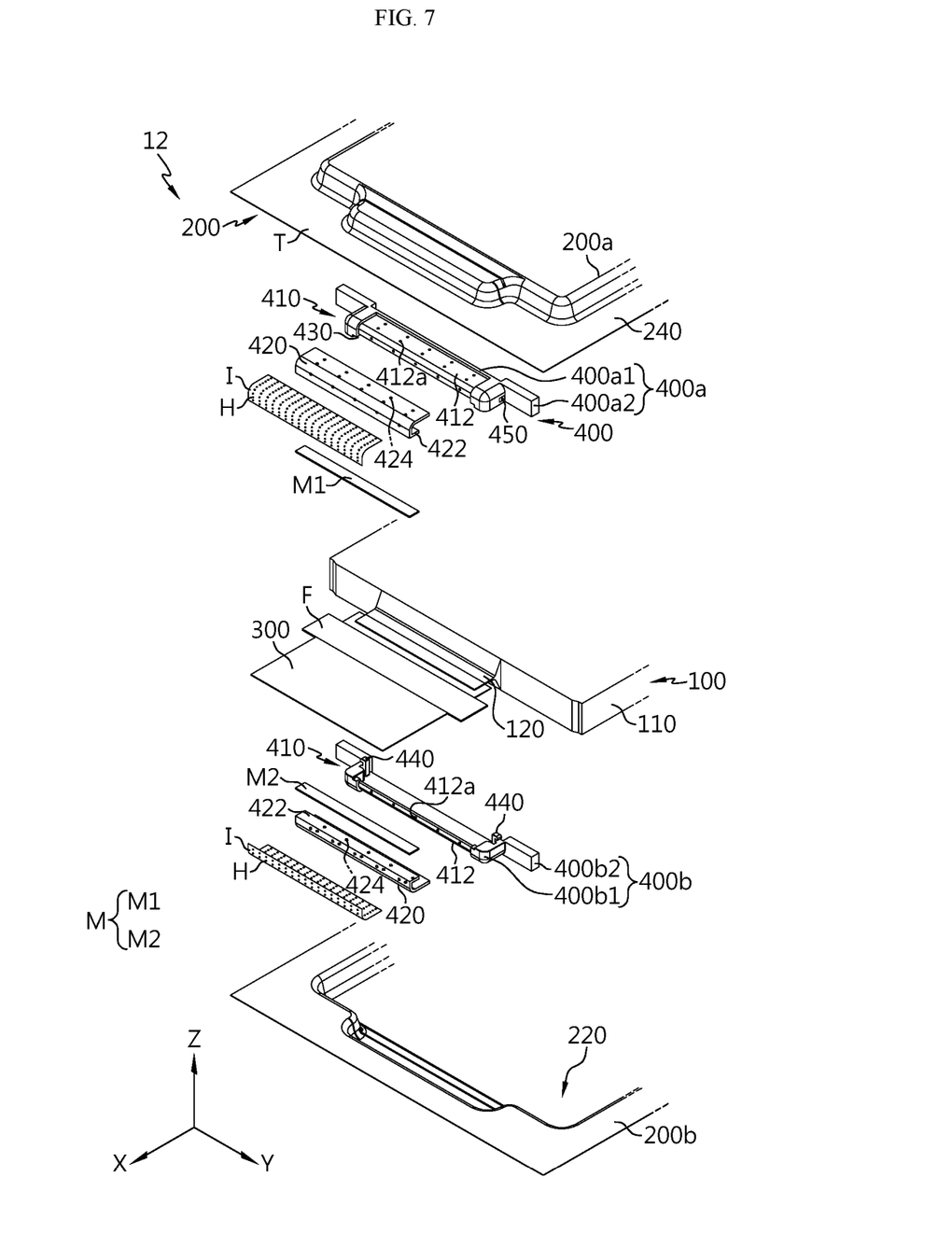
FIG. 7 is an entirely exploded perspective view showing a battery cell according to the second embodiment of the present disclosure.

FIG. 7, illustrates a battery cell 12 according to the second embodiment of the present disclosure. Because the battery cell 12 is similar to the battery cell 10, components substantially identical or similar to those of the former embodiment will not be described again, and only those features different from those of battery cell 10 will be described in detail.

Figure 8:
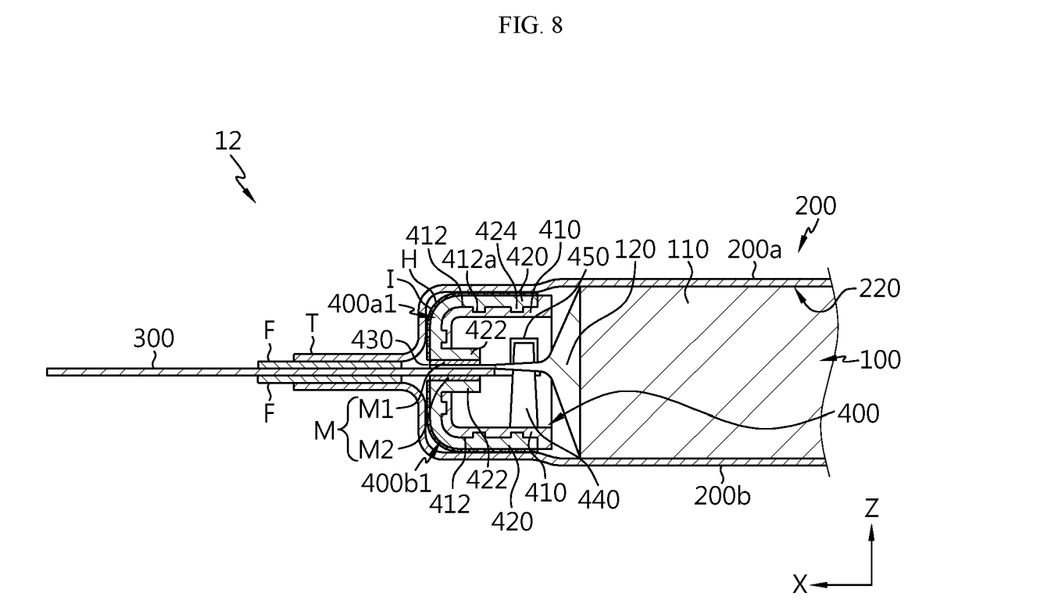
FIG. 8 is a cross-section view showing the inside of the battery cell of FIG. 7.

In the battery cell 12, the seating groove 412 of the first portion 410 includes a guide groove 412a. The guide groove 412a may be recessed toward the electrode tab 120 by a predetermined depth from the seating groove 412.

The second portion 420 may also include a protrusion 424 having a shape corresponding to the guide groove 412a. Accordingly, the protrusion 424 is configured to be inserted into the guide groove 412a to more stably and closely couple the first portion 410 and the second portion.

Consequently, the second portion 420 of battery cell 12, may be more stably seated on the first portion 410. As a result, heat generated inside the battery cell 10 may be more stably discharged to the outside of the battery cell 10.

Meanwhile, one or more battery cells 10, 12 may be utilized in a battery module. That is, a battery module according to the present disclosure may include one or more battery cells 10, 12. Specifically, one or more battery cells 10, 12 may be formed into a cell assembly, and the cell assembly may be accommodated in a module case.

In addition, at least one battery module according to the present disclosure may be utilized to configure a battery pack. That is, the battery pack according to the present disclosure may include at least one battery module according to the present disclosure. In addition, the battery pack may further include a pack case for accommodating the battery module therein and various devices for controlling the charging and discharging of the battery pack, for example a battery management system (BMS), a current sensor and a fuse.

In addition, the battery pack according to the present disclosure may be incorporated into a vehicle, such as an electric vehicle. That is, the vehicle according to the present disclosure may include at least one battery pack according to the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms indicating directions such as "upper", "lower", "left", "right", "front" and "rear" are used herein, these terms are selected just for convenience of description only, and it is obvious to those skilled in the art that these terms may change depending on the position of the stated element or an observer.

REFERENCE SIGNS 10, 12: battery cell
100: electrode assembly
110: cell body
120: electrode tab
200: cell case
300: electrode lead
400: tab protection module
410: first portion
412: recessed seating groove
412a: guide groove
420: second portion
422: bent portion
424: protrusion
I: electrical insulation member
H: heat dissipation hole
M: heat transfer member

What is claimed is:

1. A battery cell, comprising:
an electrode assembly including a cell body and an electrode tab provided to at least one side of the cell body;
a cell case accommodating the electrode assembly therein;
an electrode lead drawn out of the cell case by a predetermined length and connected to the electrode assembly through the electrode tab; and
a tab protection module accommodated in the cell case and configured to cover at least a part of the electrode tab, the tab protection module comprising a heat dissipating material configured to discharge heat outside the tab protection module wherein the tab protection module includes: a first portion having an electrically insulating material facing the electrode tab; and a second portion facing an inner surface of the cell case, the second portion comprising the heat dissipating material, wherein the first portion has a recessed seating groove that receives the second portion.

2. The battery cell according to claim 1,
wherein the second portion has a shape corresponding to the inner surface of the cell case facing the second portion.

3. The battery cell according to claim 1, further comprising:
an electrical insulation member disposed on an outer surface of the second portion that faces the inner surface of the cell case.

4. The battery cell according to claim 3,
wherein the electrical insulation member comprises at least one heat dissipation hole.

5. The battery cell according to claim 1,
wherein at least a part of the recessed seating groove is rounded and corresponds to at least a part of the second portion.

6. The battery cell according to claim 1,
wherein the recessed seating groove includes a guide groove recessed from an outer surface toward the electrode tab by a predetermined depth, and
the second portion further includes a protrusion arranged to be inserted into the guide groove.

7. The battery cell according to claim 1,
wherein the second portion includes a pair of bent portions that face each other in upper and lower direction, each of the bent portions extending from ends of the first portion and toward the cell body, and
a portion where the electrode tab and the electrode lead are connected is disposed between the pair of bent portions.

8. The battery cell according to claim 7, further comprising:
a heat transfer member disposed between each one of the pair of bent portions and the portion where the electrode tab and the electrode lead are connected.

9. A battery module, comprising at least one battery cell according to any one of claim 1.

10. A battery pack, comprising at least one battery module according to claim 9.

11. A vehicle, comprising at least one battery pack according to claim 10.

* * * * *